United States Patent
Tokuno et al.

(10) Patent No.: US 9,919,292 B2
(45) Date of Patent: Mar. 20, 2018

(54) PHOTOCATALYST BODY, PHOTOCATALYST DISPERSION, AND METHOD FOR MANUFACTURING PHOTOCATALYST BODY

(75) Inventors: Yoko Tokuno, Tokyo (JP); Nobuaki Makino, Kanagawa-ken (JP); Akito Sasaki, Kanagawa-ken (JP); Kayo Nakano, Kanagawa-ken (JP); Takao Kusaka, Kanagawa-ken (JP)

(73) Assignees: Kabushiki Kaisha Toshiba, Tokyo (JP); Toshiba Materials Co., Ltd., Yokohama-shi (JP)

( * ) Notice: Subject to any disclaimer, the term of this patent is extended or adjusted under 35 U.S.C. 154(b) by 884 days.

(21) Appl. No.: 13/211,597

(22) Filed: Aug. 17, 2011

(65) Prior Publication Data

US 2012/0065057 A1    Mar. 15, 2012

(30) Foreign Application Priority Data

Sep. 13, 2010    (JP) .................................. 2010-204973

(51) Int. Cl.
*B01J 23/30*    (2006.01)
*B01J 35/00*    (2006.01)
(Continued)

(52) U.S. Cl.
CPC ............. *B01J 23/30* (2013.01); *B01J 35/004* (2013.01); *B01J 35/023* (2013.01);
(Continued)

(58) Field of Classification Search
CPC ....................................................... B01J 23/30
(Continued)

(56) References Cited

U.S. PATENT DOCUMENTS 8,273,169 B2*    9/2012    Nakano et al. ........... 106/287.18
2011/0212832 A1*    9/2011    Nakano ................... A61L 2/232
                                                                502/305

FOREIGN PATENT DOCUMENTS

JP    11-1620    1/1999
JP    2000-155344    6/2000
(Continued)

OTHER PUBLICATIONS

Notification of Reason(s) for Refusal dated Sep. 10, 2012 in Japanese Patent Application No. 2010-204973 (with English translation).

*Primary Examiner* — Melvin C Mayes
*Assistant Examiner* — Stefanie Cohen
(74) *Attorney, Agent, or Firm* — Oblon, McClelland, Maier & Neustadt, L.L.P.

(57) ABSTRACT

According to one embodiment, a photocatalyst body satisfies at least one condition described below, (1) a ratio of an absorption intensity at a wave number of 3450 $cm^{-1}$ to a peak intensity of an absorption at about 1037 $cm^{-1}$ being 2.5 or less in an analysis of a surface of the body, (2) a ratio of a maximum peak intensity of an absorption in a wave number range of not less than 1500 $cm^{-1}$ and not more than 1700 $cm^{-1}$ to a peak intensity of an absorption at about 1037 $cm^{-1}$ being 0.7 or less in the analysis and (3) the photocatalyst body having no absorption peak in a wave number range of not less than 5000 $cm^{-1}$ and not more than 5400 $cm^{-1}$ or a ratio of a maximum peak intensity of an absorption to an absorption intensity at 5250 $cm^{-1}$ being 1.7 or less in the analysis.

9 Claims, 3 Drawing Sheets (51) Int. Cl.
*B01J 35/02* (2006.01)
*B01J 37/02* (2006.01)
*B01J 37/06* (2006.01)

(52) U.S. Cl.
CPC ........... *B01J 37/0215* (2013.01); *B01J 37/06* (2013.01); *B01D 2255/20776* (2013.01); *B01D 2255/802* (2013.01); *B01D 2255/9202* (2013.01); *B01D 2259/4508* (2013.01)

(58) Field of Classification Search
USPC .......................................................... 502/305
See application file for complete search history.

(56) References Cited

FOREIGN PATENT DOCUMENTS

| | | |
|---|---|---|
| JP | 2010-234312 | 10/2010 |
| WO | WO 2009/110234 A1 | 9/2009 |

\* cited by examiner

PHOTOCATALYST BODY, PHOTOCATALYST DISPERSION, AND METHOD FOR MANUFACTURING PHOTOCATALYST BODY

CROSS-REFERENCE TO RELATED APPLICATIONS

This application is based upon and claims the benefit of priority from the prior Japanese Patent Application No. 2010-204973, filed on Sep. 13, 2010; the entire contents of which are incorporated herein by reference.

FIELD

Embodiments described herein relate generally to a photocatalytic body, a photocatalyst dispersion, and a method for manufacturing the photocatalyst body.

BACKGROUND

Titanium dioxide, tungsten oxide, and the like are known as photocatalyst materials.

Here, "photocatalyst material" is a material that has semiconducting properties and enters an excited state to produce an electron-hole pair when it is irradiated with light having an energy higher than the band gap energy between the conduction electron band and the valence band thereof.

In the case of ultraviolet responsive titanium dioxide, it is optically excited to produce an electron-hole pair in it when irradiated with light of a wavelength of 387 nm or less. Then, the electron-hole pair generates a reactive oxygen species such as a hydroxyl radical and a superoxide ion at and around the surface of the photocatalyst material, and the oxidizing power of the reactive oxygen species causes decomposition activity and hydrophilization. Thus, these actions can be utilized to obtain self-cleaning action, deodorization action, antibacterial action, and the like.

Here, in the case of ultraviolet responsive titanium dioxide, since the major excitation light is ultraviolet light, sufficient performance cannot be obtained in a room with a low level of ultraviolet light. In view of this, photocatalyst materials such as what is called visible light responsive titanium dioxide and tungsten oxide are presented.

In general, what is called tungsten oxide is tungsten trioxide ($WO_3$), which is a metal oxide very stable in the air. Furthermore, since tungsten oxide has a band gap of 2.5 eV and can utilize visible light up to 480 nm, it is useful as a photocatalyst material for indoor use. Furthermore, tungsten oxide is relatively easily available as an industrial material, and is also a relatively inexpensive material with low harmfulness.

To use a photocatalyst in a general indoor environment, it is necessary to form a photocatalyst body in a layer or film form in which the photocatalyst is provided on a surface of a base body. When forming such a photocatalyst body, a photocatalyst dispersion that includes a photocatalyst material and a solvent including water is applied to a surface of a base body, and the resulting piece is dried to provide the photocatalyst on the surface of the base body.

Here, it is necessary to control the photocatalyst dispersion to around neutrality due to constraints of the apparatus for manufacturing the photocatalyst dispersion, constraints of the matrix for forming the photocatalyst body, and the like. Therefore, alkali ions or the like may be added. At this time, a change in the surface condition of the photocatalyst may be caused, possibly reducing the photocatalytic performance. However, there has so far been no control technology for such a change in the surface condition of the photocatalyst, and photocatalyst dispersions and photocatalyst bodies having sufficient performance for use in the actual environment are not yet available.

DETAILED DESCRIPTION

In general, according to one embodiment, a photocatalyst body includes at least one kind of fine particle selected from a tungsten oxide fine particle formed on a surface of a base body and a tungsten oxide composite fine particle formed on the surface of the base body. The photocatalyst body satisfies at least one condition of (1) to (3) below. The condition (1) is that a ratio of an absorption intensity at a wave number of 3450 $cm^{-1}$ to a peak intensity of an absorption at a wave number of about 1037 $cm^{-1}$ is 2.5 or less when a surface of the photocatalyst body is analyzed by infrared spectroscopy. The condition (2) is that a ratio of a maximum peak intensity of an absorption in a wave number range of not less than 1500 $cm^{-1}$ and not more than 1700 $cm^{-1}$ to a peak intensity of an absorption at a wave number of about 1037 $cm^{-1}$ is 0.7 or less when the surface of the photocatalyst body is analyzed by infrared spectroscopy. The condition (3) is that the photocatalyst body has no absorption peak in a wave number range of not less than 5000 $cm^{-1}$ and not more than 5400 $cm^{-1}$ or a ratio of a maximum peak intensity of an absorption to an absorption intensity at a wave number of 5250 $cm^{-1}$ is 1.7 or less when the surface of the photocatalyst body is analyzed by near infrared spectroscopy.

In general, according to another embodiment, a photocatalyst body includes at least one kind of fine particle selected from a tungsten oxide fine particle and a tungsten oxide composite fine particle formed on a surface of a base body. A ratio of a peak intensity of an absorption at a wave number of about 3690 $cm^{-1}$ to a peak intensity of an absorption at a wave number of about 1037 $cm^{-1}$ is 0.01 or more when a surface of the photocatalyst body is analyzed by infrared spectroscopy.

In general, according to another embodiment, a photocatalyst body includes at least one kind of fine particle selected from a tungsten oxide fine particle and a tungsten oxide composite fine particle formed on a surface of a base body. The photocatalyst body satisfies at least one condition of (1) to (3) below and a condition of (4) below. The condition (1) is that a ratio of an absorption intensity at a wave number of 3450 cm$^{-1}$ to a peak intensity of an absorption at a wave number of about 1037 cm$^{-1}$ is 2.5 or less when a surface of the photocatalyst body is analyzed by infrared spectroscopy. The condition (2) is that a ratio of a maximum peak intensity of an absorption in a wave number range of not less than 1500 cm$^{-1}$ and not more than 1700 cm$^{-1}$ to a peak intensity of an absorption at a wave number of about 1037 cm$^{-1}$ is 0.7 or less when the surface of the photocatalyst body is analyzed by infrared spectroscopy. The condition (3) is that the photocatalyst body has no absorption peak in a wave number range of not less than 5000 cm$^{-1}$ and not more than 5400 cm$^{-1}$ or a ratio of a maximum peak intensity of an absorption to an absorption intensity at a wave number of 5250 cm$^{-1}$ is 1.7 or less when the surface of the photocatalyst body is analyzed by near infrared spectroscopy. The condition (4) is that a ratio of a peak intensity of an absorption at a wave number of about 3690 cm$^{-1}$ to a peak intensity of an absorption at a wave number of about 1037 cm$^{-1}$ is 0.01 or more when the surface of the photocatalyst body is analyzed by infrared spectroscopy.

In general, according to another embodiment, a photocatalyst dispersion includes at least one kind of fine particle selected from a tungsten oxide fine particle and a tungsten oxide composite fine particle, and a solvent. The photocatalyst dispersion is capable of forming one of the above photocatalyst bodies by being applied to a surface of a base body.

In general, according to another embodiment, a method is disclosed for manufacturing a photocatalyst body. The method can include producing a photocatalyst dispersion including at least one kind of fine particle selected from a tungsten oxide fine particle and a tungsten oxide composite fine particle, and a solvent. The method can include applying the photocatalyst dispersion to a surface of a base body. In addition, the method can include forming a photocatalyst on the surface of the base body by drying the applied photocatalyst dispersion. A hydrogen ion exponent of the photocatalyst dispersion is adjusted in the producing the photocatalyst dispersion so that the formed photocatalyst body satisfies at least one condition of (I) to (III) below. The condition (I) is that a ratio of an absorption intensity at a wave number of 3450 cm$^{-1}$ to a peak intensity of an absorption at a wave number of about 1037 cm$^{-1}$ is 2.5 or less when a surface of the photocatalyst body is analyzed by infrared spectroscopy. The condition (II) is that a ratio of a maximum peak intensity of an absorption in a wave number range of not less than 1500 cm$^{-1}$ and not more than 1700 cm$^{-1}$ to a peak intensity of an absorption at a wave number of about 1037 cm$^{-1}$ is 0.7 or less when the surface of the photocatalyst body is analyzed by infrared spectroscopy. The condition (III) is that the photocatalyst body has no absorption peak in a wave number range of not less than 5000 cm$^{-1}$ and not more than 5400 cm$^{-1}$ or a ratio of a maximum peak intensity of an absorption to an absorption intensity at a wave number of 5250 cm$^{-1}$ is 1.7 or less when the surface of the photocatalyst body is analyzed by near infrared spectroscopy.

In general, according to another embodiment, a method is disclosed for manufacturing a photocatalyst body. The method can include producing a photocatalyst dispersion including at least one kind of fine particle selected from a tungsten oxide fine particle and a tungsten oxide composite fine particle, and a solvent. The method can include applying the photocatalyst dispersion to a surface of a base body. In addition, The method can include forming a photocatalyst on the surface of the base body by drying the applied photocatalyst dispersion. A hydrogen ion exponent of the photocatalyst dispersion is adjusted in the producing the photocatalyst dispersion so that the formed photocatalyst body satisfies a condition of (IV) below. The condition (IV) is that a ratio of a peak intensity of an absorption at a wave number of about 3690 cm$^{-1}$ to a peak intensity of an absorption at a wave number of about 1037 cm$^{-1}$ is 0.01 or more when a surface of the photocatalyst body is analyzed by infrared spectroscopy.

In general, according to another embodiment, a method is disclosed for manufacturing a photocatalyst body. The method can include producing a photocatalyst dispersion including at least one kind of fine particle selected from a tungsten oxide fine particle and a tungsten oxide composite fine particle, and a solvent. The method can include applying the photocatalyst dispersion to a surface of a base body. In addition, the method can include forming a photocatalyst on the surface of the base body by drying the applied photocatalyst dispersion. A hydrogen ion exponent of the photocatalyst dispersion is adjusted in the producing the photocatalyst dispersion so that the formed photocatalyst body satisfies at least one condition of (I) to (III) below and a condition of (IV) below. The condition (I) is that a ratio of an absorption intensity at a wave number of 3450 cm$^{-1}$ to a peak intensity of an absorption at a wave number of about 1037 cm$^{-1}$ is 2.5 or less when a surface of the photocatalyst body is analyzed by infrared spectroscopy. The condition (II) is that a ratio of a maximum peak intensity of an absorption in a wave number range of not less than 1500 cm$^{-1}$ and not more than 1700 cm$^{-1}$ to a peak intensity of an absorption at a wave number of about 1037 cm$^{-1}$ is 0.7 or less when the surface of the photocatalyst body is analyzed by infrared spectroscopy. The condition (III) is that the photocatalyst body has no absorption peak in a wave number range of not less than 5000 cm$^{-1}$ and not more than 5400 cm$^{-1}$ or a ratio of a maximum peak intensity of an absorption to an absorption intensity at a wave number of 5250 cm$^{-1}$ is 1.7 or less when the surface of the photocatalyst body is analyzed by near infrared spectroscopy. The condition (IV) is that a ratio of a peak intensity of an absorption at a wave number of about 3690 cm$^{-1}$ to a peak intensity of an absorption at a wave number of about 1037 cm$^{-1}$ is 0.01 or more when the surface of the photocatalyst body is analyzed by infrared spectroscopy.

Various embodiments will be described hereinafter with reference to the accompanying drawings.

A photocatalyst body according to an embodiment of the invention is a photocatalyst body including at least one kind of fine particle selected from a tungsten oxide fine particle and a tungsten oxide composite fine particle formed on a surface of a base body, in which the photocatalyst body satisfies at least one condition of (1) to (3) below.

(1) The ratio of the absorption intensity at a wave number of 3450 cm$^{-1}$ to the peak intensity of the absorption at a wave number of about 1037 cm$^{-1}$ is 2.5 or less when the surface of the photocatalyst body is analyzed by infrared spectroscopy.

This is referred to as "the absorption intensity ratio of water (i)."

(2) The ratio of the maximum peak intensity of the absorption in a wave number range of not less than 1500 cm$^{-1}$ and not more than 1700 cm$^{-1}$ to the peak intensity of the absorption at a wave number of about 1037 cm$^{-1}$ is 0.7 or less when the surface of the photocatalyst body is analyzed by infrared spectroscopy.

This is referred to as "the absorption intensity ratio of water (ii)."

(3) The photocatalyst body has no absorption peak in a wave number range of not less than 5000 $cm^{-1}$ and not more than 5400 $cm^{-1}$, or the ratio of the maximum peak intensity of the absorption to the absorption intensity at a wave number of 5250 $cm^{-1}$ is 1.7 or less when the surface of the photocatalyst body is analyzed by near infrared spectroscopy.

This is referred to as "the absorption intensity ratio of water (iii)."

If water is adsorbed on the surface of a photocatalyst formed of tungsten oxide-based fine particles, the photocatalytic performance decreases. According to the embodiment, the ratio of the absorption intensity indicating the adsorption of water to the absorption intensity of tungsten oxide is controlled to a low level; thereby, high photocatalytic performance can be exhibited. Specifically, the absorption intensity ratio of water (i) is 2.5 or less, the absorption intensity ratio of water (ii) is 0.7 or less, or the absorption intensity ratio of water (iii) is 1.7 or less.

"The absorption intensity of water" is an absorption intensity by the OH stretching or the OH bending of water or an absorption intensity by the combination tone absorption of water, and appears at a wave number of about 3450 $cm^{-1}$, in a wave number range of not less than 1500 $cm^{-1}$ and not more than 1700 $cm^{-1}$, or in a wave number range of not less than 5000 $cm^{-1}$ and not more than 5400 $cm^{-1}$. Therefore, as the absorption intensities in these ranges increase, the amount of the water adsorbed on the surface of the photocatalyst increases.

Here, the hydrogen ion concentration index of a photocatalyst dispersion affects the amount of the water adsorbed on the surface of the photocatalyst. When preparing a photocatalyst dispersion, there is a case where the hydrogen ion concentration is adjusted in order to improve dispersiveness, protect the apparatus or the matrix, or something. At this time, the photocatalytic performance is influenced by the hydrogen ion concentration index. As the hydrogen ion concentration index of the photocatalyst dispersion increases (gets close to neutrality), the amount of the water adsorbed on the surface of the photocatalyst increases and the catalytic activity of the photocatalyst decreases.

"The absorption intensity ratio of water (i)" is preferably 0.9 or less, more preferably 0.7 or less. "The absorption intensity ratio of water (ii)" is preferably 0.5 or less, more preferably 0.4 or less.

Next, a tungsten oxide fine particle and a tungsten oxide composite fine particle, which are photocatalyst materials, are described. Herein, "fine particle" refers to those having an average primary particle diameter (D50) of not less than 1 nm and not more than 400 nm. In regard to the average primary particle diameter (D50), particles of a photocatalyst body or particles made by drying a dispersion are evaluated by SEM, TEM, or the like; an image analysis of a photograph is made to estimate the n of particles; and the average primary particle diameter (D50) is found based on the average particle diameter in the integrated diameter on a volumetric basis of the particles of which the n is not less than 50. As the particle diameter of the photocatalyst decreases, that is, the specific surface area increases, the photocatalytic performance becomes higher. The average primary particle diameter (D50) is preferably within a range of not less than 2.7 nm and not more than 75 nm.

Tungsten oxide composite material refers to those including at least one metal element selected from Ti, Mn, Fe, Pd, Pt, Cu, Ag, Al, and Ce in an amount between 0.01 to 2 mass %. The existence form of them may be a simple substance of a metal element, a compound including a metal element, or a composite compound compounded with tungsten oxide. The compounding method may be a mixing method, impregnating method, supporting method, and the like, and is not specifically limited.

Next, a photocatalyst body according to another embodiment is a photocatalyst body including at least one kind of fine particle selected from a tungsten oxide fine particle and a tungsten oxide composite fine particle formed on a surface of a base body, in which the ratio of the peak intensity of the absorption at a wave number of about 3690 $cm^{-1}$ to the peak intensity of the absorption at a wave number of about 1037 $cm^{-1}$ is 0.01 or more when the surface of the photocatalyst body is analyzed by infrared spectroscopy. The intensity ratio at this time is referred to as "the absorption intensity ratio of hydroxyl group."

If the amount of the hydroxyl groups (—OH) at the surface of a photocatalyst formed of tungsten oxide-based fine particles is small, the photocatalytic performance decreases. According to the embodiment, hydroxyl groups (—OH) are made to exist in large amounts, that is, the ratio of the absorption intensity indicating the presence of hydroxyl groups (—OH) to the absorption intensity of tungsten oxide is controlled to a high level; thereby, high photocatalytic performance can be exhibited. Furthermore, the presence of hydroxyl groups at the surface of the photocatalyst in large amounts allows tungsten oxide particles to bind strongly via an oxygen group (—O—) during drying. Thus, the embodiment has also the advantage that a photocatalyst body with a high hardness can be formed.

Specifically, "the absorption intensity ratio of hydroxyl group" is preferably not less than 0.01, more preferably not less than 0.02, still more preferably not less than 0.025.

In the case where the amount of the water adsorbed on the surface of the photocatalyst body and the amount of the hydroxyl groups are simultaneously controlled and the characteristics of the absorption intensity ratio mentioned above are satisfied, high photocatalytic performance can be exhibited.

In the case where a photocatalyst dispersion is applied to a surface of a substrate to form a photocatalyst body and the evaluation of the photocatalyst body obtained shows that the photocatalyst body has the characteristics of the absorption intensity ratio mentioned above, the photocatalyst dispersion has characteristics allowing the photocatalyst body of the invention to be formed.

Here, a method for evaluating a photocatalyst body is described.

The bonding state of the water adsorbed on the surface of the photocatalyst body is analyzed by Fourier transform infrared spectroscopy (FT-IR) and near infrared spectroscopy (NIR). At this time, the analysis is performed under a reduced pressure of $10^2$ Pa or less in order to prevent water in the air from adhering to a sample.

Out of "the absorption intensities of water," a value based on the peak value of an absorption spectrum obtained by infrared spectroscopy at a wave number of about 3450 $cm^{-1}$ is taken as the absorption intensity related to the OH stretching of water. A value based on the maximum peak value of the absorption in a wave number range of not less than 1500 $cm^{-1}$ and not more than 1700 $cm^{-1}$ is taken as the absorption intensity related to the OH bending of water. A value based on the peak value of an absorption spectrum obtained by near infrared spectroscopy in a wave number range of not less than 5000 $cm^{-1}$ and not more than 5400 $cm^{-1}$ is taken as the absorption intensity related to the combination tone absorption of water.

On the other hand, "the absorption intensity of tungsten oxide ($WO_3$)" is an absorption intensity related to the WO stretching of tungsten oxide ($WO_3$), and a value based on the peak value of an infrared absorption spectrum obtained by infrared spectroscopy at a wave number of 1037 $cm^{-1}$ is taken as the absorption intensity of tungsten oxide ($WO_3$).

In regard to "the absorption intensity of hydroxyl group," a value based on the peak value of an absorption spectrum obtained by infrared spectroscopy at a wave number of about 3690 $cm^{-1}$ is taken as the absorption intensity of hydroxyl group. The peak, however, may be the peak of a shoulder of the absorption peak (main peak) of water at about 3450 $cm^{-1}$. In regard to the peak intensity in the case of a shoulder peak, a base line is defined in the inclined portion of the main peak, and a value obtained by subtracting the intensity of the base line at the object wave number from the original peak intensity of the shoulder peak is used as the peak intensity of the shoulder peak.

Next, a method for manufacturing a photocatalyst body according to the embodiment is illustrated.

A method for manufacturing a photocatalyst body according to the embodiment includes producing a photocatalyst dispersion that includes a photocatalyst material including a tungsten oxide fine particle and a tungsten oxide composite fine particle and a solvent, applying the photocatalyst dispersion to a surface of a base body, and forming a photocatalyst on the surface of the base body by drying the applied photocatalyst dispersion.

First, producing a photocatalyst dispersion that includes a photocatalyst material including a tungsten oxide fine particle and a tungsten oxide composite fine particle and a solvent is illustrated.

As the solvent, water, an organic solvent such as alcohol, a mixed liquid of water and an organic solvent, and the like can be illustrated.

An ion additive and the like may be added. In this case, an inorganic alkali and an organic alkali may be used. In this case, as described above, in those cases where the range of the hydrogen ion concentration index is defined by the material of the base body to which the photocatalyst dispersion is applied and the like, an appropriate ion additive may be employed accordingly.

As described above, "the absorption intensity ratio of water (i)" is preferably not more than 2.5 when an analysis by infrared spectroscopy is made. Alternatively, "the absorption intensity ratio of water (ii)" is preferably not more than 0.7. Alternatively, "the absorption intensity ratio of water (iii)" is preferably not more than 1.7 when an analysis by near infrared spectroscopy is made.

Furthermore, "the absorption intensity ratio of hydroxyl group" is preferably not less than 0.01 when an analysis by infrared spectroscopy is made.

In this case, by using an ion additive and the like to adjust the hydrogen ion concentration index of the photocatalyst dispersion, a photocatalyst satisfying at least one of these conditions can be formed on the surface of the base body.

It has been found that the amount of the water adsorbed on the surface of the photocatalyst varies with the type of the ion additive used for the adjustment of the hydrogen ion exponent.

The manner of the change in the amount of the water adsorbed on the surface of the photocatalyst varies with the type of the ion additive used for the adjustment of the hydrogen ion exponent. For example, in a region near neutrality, the amount of the water adsorbed on the surface of the photocatalyst can be made smaller when ammonia ($NH_3$) is used as the ion additive.

In the case where ammonia ($NH_3$) is used as the ion additive, it is considered that, since the water adsorbed on the surface of the photocatalyst becomes ammonia water, the water adsorbed on the surface of the photocatalyst is easily vaporized away by heating during the formation of a sample. Therefore, it is considered that, in a region near neutrality where the amount of the added ion additive is large, the amount of the water adsorbed on the surface of the photocatalyst was able to be made smaller than when sodium hydroxide (NaOH) was used.

Here, the type of the ion additive is not limited to those illustrated but may be altered as appropriate.

For example, in addition to sodium hydroxide (NaOH) and ammonia ($NH_3$), an inorganic alkali such as ammonium hydroxide ($NH_4OH$), potassium hydroxide (KOH), and sodium carbonate ($Na_2CO_3$) and an organic alkali such as tetramethylammoium hydroxide (TMAH) may be used.

In this case, in the case where the hydrogen ion concentration index of the photocatalyst dispersion is small (the case of the acidity side), it is considered that the amount of the water adsorbed on the surface of the photocatalyst can be made smaller when an inorganic alkali, which produces an ion with a small ion radius, is used, because the inorganic alkali has a larger salting-out effect.

In the case where the hydrogen ion concentration index of the photocatalyst dispersion is nearly neutral, it is considered that the amount of the water adsorbed on the surface of the photocatalyst can be made smaller when an organic alkali, which produces an ion with a large ion radius, is used, because the organic alkali attracts water less easily.

Thus, in those cases where the range of the hydrogen ion concentration index is defined by the material of the base body to which the photocatalyst dispersion is applied and the like, an appropriate ion additive may be employed accordingly.

Similarly, also the amount of the hydroxyl groups at the surface of the photocatalyst varies with the type of the ion additive used for the adjustment of the hydrogen ion exponent. The amount of the hydroxyl groups at the surface of the photocatalyst is larger when ammonia ($NH_3$) is used than when tetramethylammonium hydroxide (TMAH) is used.

By controlling the amounts of the adsorbed water and the hydroxyl groups at the surface of the photocatalyst simultaneously, a decrease in the photocatalytic performance can be suppressed and high performance can be exhibited.

Furthermore, also in particles of tungsten oxide as in the case of particles of a general metal oxide, as the hydrogen ion exponent increases, the absolute value of zeta potential increases to increase the dispersiveness of the dispersion. If the dispersiveness of the dispersion increases, since aggregation and the like are suppressed to provide homogeneity during forming the photocatalyst body, high photocatalytic performance can be exhibited. It is necessary to select the ion additive and adjust the hydrogen ion concentration in consideration of all of them.

For example, in the case where the photocatalyst material is tungsten oxide ($WO_3$), the hydrogen ion concentration index of the photocatalyst dispersion may be set not more than pH 7.1. The hydrogen ion concentration index of the photocatalyst dispersion is more preferably set not more than pH 5.5

The photocatalyst body according to the embodiment can reduce the amount of the water adsorbed on the surface of the photocatalyst or prevent the amount of the hydroxyl groups from decreasing, and can thereby suppress a decrease in the catalytic activity of the photocatalyst.

Next, a process for applying the photocatalyst dispersion to a surface of a base body is illustrated.

The material of the base body is not specifically limited. Various materials, for example, an inorganic material such as glass and ceramics, a metal material such as stainless steel, an organic material such as a polymer material, and the like may be used. The shape and size thereof may be determined as appropriate. In the case where an organic material such as a polymer material is used as the base body, the base body may be decomposed or degraded due to the action of the photocatalyst. Therefore, in the case where a base body made of an organic material is used, an intermediate layer is preferably provided between the photocatalyst and the base body. As the intermediate layer, for example, a silicone resin layer, an acrylic modified silicone resin layer, an organic-inorganic composite gradient layer, and the like can be illustrated.

The applying method is not specifically limited. For example, a dip coating method, spin coating method, spray coating method, bar coating method, knife coating method, roll coating method, blade coating method, die coating method, gravure coating method, and the like can be illustrated.

The viscosity of the photocatalyst dispersion may be appropriately altered to improve the workability of the applying operation. For example, the photocatalyst dispersion preferably has a high viscosity for a place susceptible to a disturbance such as wind, a vertical surface, and the like. Thereby, dripping and the like can be suppressed to improve workability. On the other hand, by using a photocatalyst dispersion with a low viscosity, the uniformity of the thickness of the photocatalyst can be increased.

The viscosity of the photocatalyst dispersion can be adjusted by adding a binder such as colloidal silica and colloidal alumina. In the case where a binder is added, the hydrogen ion exponent of the photocatalyst dispersion after adding is set within the range described above.

Next, a process for drying the applied photocatalyst dispersion to form a photocatalyst on the surface of the base body is illustrated.

The method for drying the applied photocatalyst dispersion is not specifically limited. For example, natural drying (room temperature drying), drying by heating, drying in a reduced-pressure atmosphere, and the like may be used.

However, from the viewpoint of reducing the amount of the water adsorbed on the surface of the photocatalyst, drying by heating is preferable. For example, the photocatalyst dispersion applied to the surface of the base body may be heated at not less than 110° C. and not more than 500° C. to be dried.

It is also possible to dry the photocatalyst dispersion applied to the surface of the base body in an atmosphere with a pressure lower than atmospheric pressure. There is a case where the photocatalyst dispersion applied to the surface of the base body cannot be dried at high temperature, depending on the material of the base body and the like. In such a case, the photocatalyst dispersion applied to the surface of the base body may be dried in an atmosphere with a pressure lower than atmospheric pressure.

Further, it is also possible to dry the photocatalyst dispersion applied to the surface of the base body at high temperature and in an atmosphere with a pressure lower than atmospheric pressure.

That is, the applied photocatalyst dispersion may be dried by at least one of being heated at not less than 110° C. and not more than 500° C. and being placed in an atmosphere with a pressure lower than atmospheric pressure. If the heating temperature is excessively high, photocatalyst particles may experience grain growth to reduce the photocatalytic activity. Temperatures not more than 400° C. are preferable, and the heating time may be further used to control the operation.

Depending on the combination of drying conditions, a decrease in the amount of the hydroxyl groups is further caused together with a decrease in the amount of the water adsorbed on the surface of the photocatalyst. In this case, even if a decrease in the amount of the hydroxyl groups is caused, a decrease in the photocatalytic performance is suppressed by one of the characteristics of the absorption peak intensity ratio mentioned above being satisfied.

Next, the concentration of the photocatalyst dispersion is described. The concentration of the photocatalyst fine particles is preferably not less than 0.1 mass % and not more than 20 mass %, because an excessively high concentration reduces dispersiveness and increases viscosity to impede the formation of the photocatalyst body.

The use of the photocatalyst body manufactured is not specifically limited, and the photocatalyst body can be widely used for various members, products, and the like.

For example, an indoor or outdoor building material or the like with the photocatalyst formed on its surface can be illustrated. If the photocatalyst can be formed on the surface of an indoor or outdoor building material or the like, sunlight or indoor light can be utilized to decompose and remove harmful substances and odor substances in the air, and to exhibit good functions such as antifouling properties, antibacterial properties, antivirus properties, and antifungal properties.

In this case, since tungsten oxide ($WO_3$) is used as the photocatalyst material, the action of the photocatalyst can be exhibited even in a room with a low level of ultraviolet light and the like. Therefore, even in a room and the like, harmful substances such as acetaldehyde and formaldehyde can be decomposed and removed using indoor light. Thus, the embodiment is beneficial also as a measure against the sick house syndrome Examples of the use of the photocatalyst body include wallpapers, curtains, carpets, interior goods, ceiling materials, floor materials, windowpanes, mirrors, tiles, sanitary goods, furniture, lighting apparatus, filter parts of air-conditioning equipment and deodorant devices, home appliances, stationery, pet-related products, packaging materials, information recording media, and the like.

In addition, the photocatalyst body can be used also for a member of the outer surface of a building. For example, it can be used also for a building material (e.g. a gypsum plasterboard, cement hardened slab, concrete slab, wood fiber board, etc.) of the wall surface of a building.

Furthermore, the photocatalyst body can be used also for the inner and outer wall surfaces and interior and exterior equipment of transportation machinery such as automobiles, trains, aircrafts, and vessels, packaging containers for foods etc., and the like.

As the matrix used, glass, ceramics, plastics, resin such as acrylic resins, paper, fiber, metal, wood, and the like are given.

The method for manufacturing a photocatalyst body according to the embodiment can reduce the amount of the water adsorbed on the surface of the photocatalyst or keep the amount of the hydroxyl groups large, and can thereby suppress a decrease in the catalyst activity of the photocatalyst.

EXAMPLE

First, the evaluation of the photocatalytic performance of a photocatalyst body is described. The photocatalytic performance is evaluated by measuring the decomposition rate of acetaldehyde gas. Specifically, a flow-type apparatus similar to that used in the evaluation of the performance of nitrogen oxide removal (the performance of nitrogen oxide decomposition) of JIS-R-1701-1 (2004) is used to measure the gas decomposition rate using the following conditions.

The initial concentration of acetaldehyde is adjusted to 10 ppm, the gas flow rate is adjusted to 140 mL/min, and the size of a sample is adjusted to 5×10 cm. In the case of making an evaluation from a photocatalyst dispersion, the sample amount in a dry state is usually 0.2 g, but this time the sample amount was 0.03 g in order to make clear the difference in the case where the photocatalytic performance is improved. The photocatalyst dispersion is applied to a glass plate of 5×10 cm and is heated to 150° C. to be dried to form a photocatalyst body. Although usually irradiation with a black light is performed for 12 hours as a pretreatment, since this time the photocatalyst body is measured immediately after being formed and there is little influence of the adhesion of dirt and the like, the pretreatment is omitted. In those cases of getting a photocatalyst body for evaluation, the pretreatment is performed. A white fluorescent light (FL20SS•W/18, manufactured by Toshiba Lighting & Technology Corporation) is used as a light source, and an ultraviolet cut filter (CLAREX N-169, manufactured by Nitto Jushi Kogyo Co., Ltd.) is used to cut wavelengths below 380 nm. The illuminance is adjusted to 6000 lx. In the beginning, light is not applied to wait until the gas adsorption stops and the condition is stabilized. After the condition is stabilized, light irradiation is started. Light is applied under such conditions, and the gas concentration after 15 minutes is measured to find the gas decomposition rate. However, in the case where the gas concentration is not stabilized after 15 minutes has elapsed, the average of the minimum value of the gas concentration and the gas concentration at the time when 15 minutes has elapsed is found and measured.

A value calculated based on [Formula: $(A-B)/A \times 100$] is defined as the gas decomposition rate (%), where A is the gas concentration before light irradiation and B is the gas concentration at the time when 15 minutes or more has elapsed from the start of light irradiation and the condition is stabilized. Multi-Gas Monitor 1412 manufactured by INOVA Corporation is used as a gas analysis apparatus.

Example 1

Various dispersions in which tungsten oxide fine particles with average primary particle diameters (D50) of 25 to 35 nm were dispersed in water were used; the hydrogen ion concentration index of each dispersion was adjusted; each dispersion was applied to a surface of a glass substrate; the resulting piece was heated to 150° C. to form a photocatalyst body on the surface of the base body; and samples were thus prepared. Sodium hydroxide (NaOH) was used as an ion additive.

Figure 1:
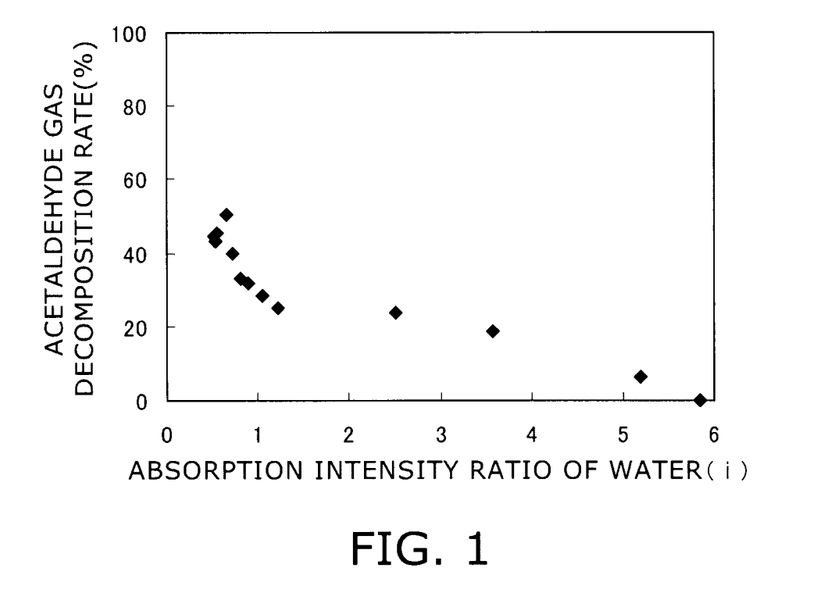
FIG. 1 shows the relationship between the absorption intensity ratio of water (i) on the surface of the photocatalyst and the acetaldehyde gas decomposition rate by the photocatalyst.
Figure 2:
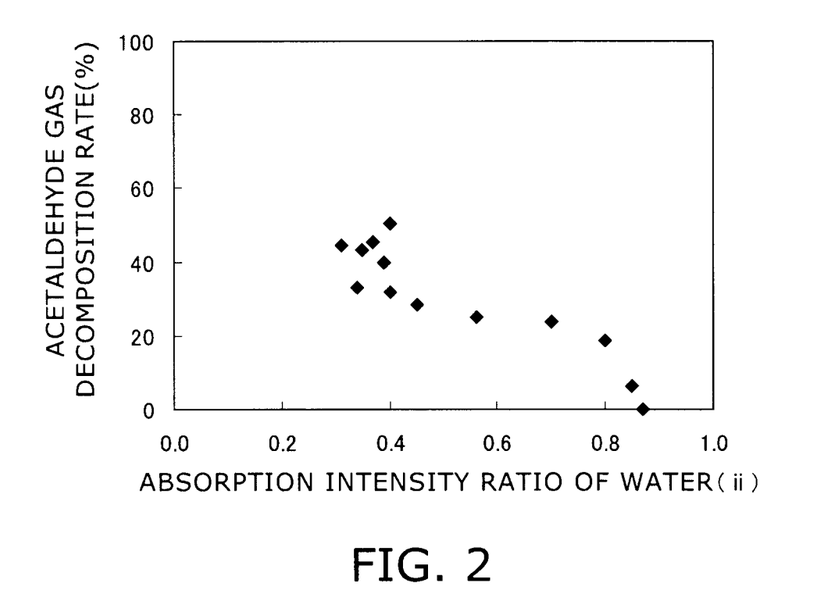
FIG. 2 shows the relationship between the absorption intensity ratio of water (ii) on the surface of the photocatalyst and the acetaldehyde gas decomposition rate by the photocatalyst.

For the photocatalyst bodies obtained, the measurement of the hydrogen ion concentration index, the determination of the absorption intensity ratio of water (i) and the absorption intensity ratio of water (ii) by infrared spectroscopy, and the determination of the acetaldehyde gas decomposition rate were made. Table 1 shows the results. FIG. 1 shows the relationship between the absorption intensity ratio of water (i) and the acetaldehyde gas decomposition rate, and FIG. 2 shows the relationship between the absorption intensity ratio of water (ii) and the acetaldehyde gas decomposition rate.

Figure 3:
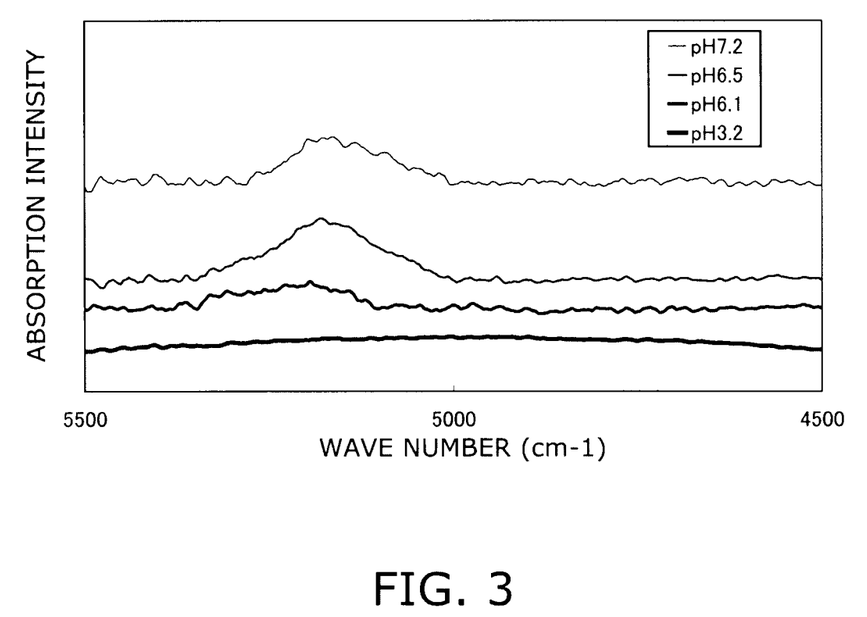
FIG. 3 shows the absorption intensity of water on the surface of the photocatalyst by near infrared spectroscopy.

Furthermore, the determination of the absorption intensity ratio of water (iii) by near infrared spectroscopy was made for the photocatalyst bodies obtained. Table 2 shows the results, and FIG. 3 shows an example of the profile of the absorption intensity data.

Figure 4:
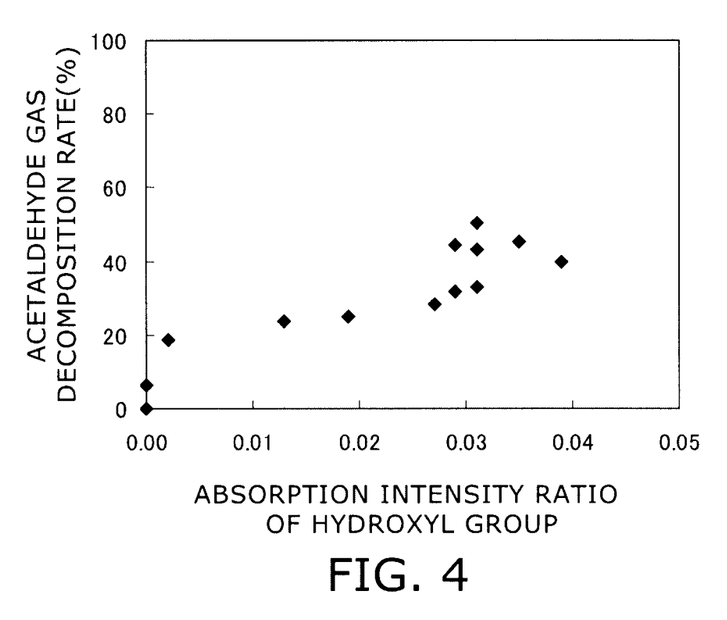
FIG. 4 shows the relationship between the absorption intensity ratio of hydroxyl group on the surface of the photocatalyst and the acetaldehyde gas decomposition rate by the photocatalyst.

Moreover, the determination of the absorption intensity ratio of hydroxyl group by infrared spectroscopy was made for the photocatalyst bodies obtained. Table 1 shows the results. FIG. 4 shows the relationship between the absorption intensity ratio of hydroxyl group and the acetaldehyde gas decomposition rate.

TABLE 1

| | pH | Absorption intensity ratio of water (i) | Absorption intensity ratio of water (ii) | Absorption intensity ratio of hydroxyl group | Gas decomposition rate [%] |
|---|---|---|---|---|---|
| Example 1 | 3.2 | 0.73 | 0.39 | 0.039 | 40 |
| | 3.4 | 0.55 | 0.37 | 0.035 | 45 |
| | 3.8 | 0.53 | 0.35 | 0.031 | 43 |
| | 4.2 | 0.65 | 0.40 | 0.031 | 50 |
| | 4.7 | 0.51 | 0.31 | 0.029 | 44 |
| | 5.0 | 0.81 | 0.34 | 0.031 | 33 |
| | 5.5 | 0.90 | 0.40 | 0.029 | 32 |
| | 6.1 | 1.05 | 0.45 | 0.027 | 28 |
| | 6.5 | 1.22 | 0.56 | 0.019 | 25 |
| | 6.9 | 2.50 | 0.70 | 0.013 | 24 |
| Comparative example 1 | 7.1 | 3.57 | 0.80 | 0.002 | 19 |
| | 7.2 | 5.19 | 0.85 | 0.000 | 6 |
| | 7.7 | 5.84 | 0.87 | 0.000 | 0 |

TABLE 2

| | pH | Absorption intensity ratio of water (iii) | Gas decomposition rate [%] |
|---|---|---|---|
| Example 1 | 3.2 | no peak | 40 |
| | 6.1 | 1.54 | 28 |
| Comparative example 1 | 6.5 | 2.03 | 25 |
| | 6.9 | 2.37 | 24 |
| | 7.1 | 3.33 | 19 |
| | 7.2 | 3.85 | 6 |

The photocatalyst bodies were within a range of pH 3.2 to pH 6.9. At this time, the acetaldehyde gas decomposition performance was high when the absorption intensity ratio of water or the absorption intensity ratio of hydroxyl group was within the range provided in the invention. As compared to the case of an ordinary sample amount, the value of the gas decomposition rate itself is low in the measurement, because the sample amount is small. However, the photocatalyst body of a sample amount of 0.03 g and a gas decomposition rate of 40% exhibits a gas decomposition rate of about 80% when it is in an ordinary sample amount of 0.2 g, and has high photocatalytic performance.

Comparative Example 1

Dispersions of tungsten oxide fine particles were used similarly to Example 1; the hydrogen ion concentration index was adjusted; and photocatalyst bodies were formed to prepare samples. Sodium hydroxide (NaOH) was used as an ion additive.

Similar measurement and determination were made for the photocatalyst bodies obtained. The results are shown in Table 1, Table 2, FIG. 1, FIG. 2, FIG. 3, and FIG. 4.

The photocatalyst bodies were within a range of pH 7.1 to pH 7.7. At this time, the range of the absorption intensity ratio of water or the absorption intensity ratio of hydroxyl group provided in the invention was not satisfied, and the acetaldehyde gas decomposition performance was low.

From these results, it has been confirmed that the gas decomposition performance is higher when the amount of the adsorbed water at the surface of the photocatalyst is smaller and the amount of the hydroxyl groups is larger. Furthermore, higher gas decomposition performance is exhibited in the case where both of the amount of the adsorption of water being small and the amount of the hydroxyl groups being large are satisfied.

Example 2

Dispersions of tungsten oxide fine particles were used similarly to Example 1; the hydrogen ion concentration index was adjusted; and photocatalyst bodies were formed to prepare samples. Ammonia ($NH_3$) was used as an ion additive.

Figure 5:
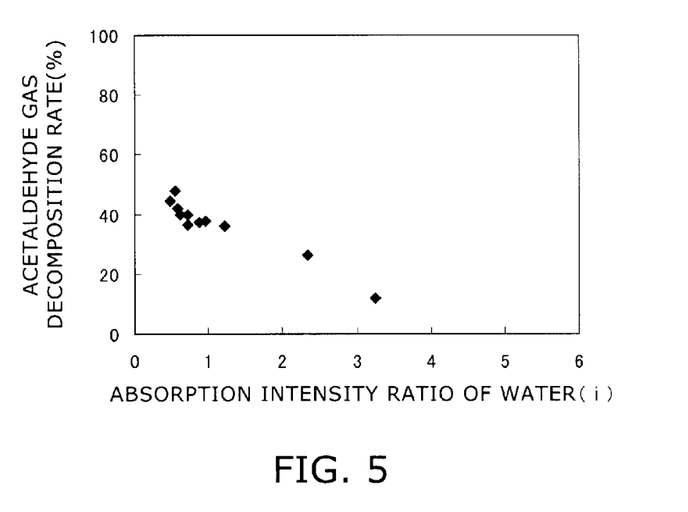
FIG. 5 shows the relationship between the absorption intensity ratio of water (i) on the surface of the photocatalyst and the acetaldehyde gas decomposition rate by the photocatalyst when $NH_3$ is used as an ion additive.

For the photocatalyst bodies obtained, the measurement of the hydrogen ion concentration index, the determination of the absorption intensity ratio of water (i) by infrared spectroscopy, and the determination of the acetaldehyde gas decomposition rate were made. Table 3 shows the results. FIG. 5 shows the relationship between the absorption intensity ratio of water (i) and the acetaldehyde gas decomposition rate.

TABLE 3

|  | pH | Absorption intensity ratio of water (i) | Gas decomposition rate [%] |
|---|---|---|---|
| Example 2 | 3.2 | 0.73 | 40 |
|  | 3.4 | 0.58 | 42 |
|  | 3.9 | 0.55 | 48 |
|  | 4.5 | 0.48 | 44 |
|  | 4.8 | 0.61 | 40 |
|  | 5.3 | 0.72 | 36 |
|  | 6 | 0.88 | 37 |
|  | 6.4 | 0.97 | 38 |
|  | 6.8 | 1.22 | 36 |
|  | 7.1 | 2.34 | 26 |
| Comparative example 2 | 7.7 | 3.24 | 12 |

The photocatalyst bodies were within a range of pH 3.2 to pH 7.7. At this time, the acetaldehyde gas decomposition performance was high when the absorption intensity ratio of water or the absorption intensity ratio of hydroxyl group was within the range provided in the invention.

Comparative Example 2

A dispersion of tungsten oxide fine particles was used similarly to Example 1; the hydrogen ion concentration index was adjusted; and a photocatalyst body was formed to prepare a sample. Ammonia ($NH_3$) was used as an ion additive.

Similar measurement and determination to Example 2 were made for the photocatalyst body obtained. The results are shown in Table 3 and FIG. 5.

The pH of the photocatalyst body was 7.7. At this time, the range of the absorption intensity ratio of water or the absorption intensity ratio of hydroxyl group provided in the invention was not satisfied, and the acetaldehyde gas decomposition performance was low.

From these results, it has been confirmed that, in a region near neutrality where the amount of the added ion additive is large, the amount of the water adsorbed on the surface of the photocatalyst can be made smaller in the case of using ammonia ($NH_3$) than in the case of using sodium hydroxide (NaOH).

Example 3

Samples of photocatalyst bodies were prepared by a similar method to Example 1. Photocatalyst dispersions were applied to surfaces of glass substrates. Two conditions of heating temperature were used: heating at 150° C.; and heating at 150° C. and then further heating at 400° C.

For the photocatalyst bodies obtained, the determination of the absorption intensity ratio of water (i) and the absorption intensity ratio of hydroxyl group by infrared spectroscopy and the determination of the acetaldehyde gas decomposition rate were made. Table 4 shows the results.

TABLE 4

|  | Drying temperature [° C.] | Absorption intensity ratio of water (i) | Absorption intensity ratio of hydroxyl group | Gas decomposition rate [%] |
|---|---|---|---|---|
| Example 3 | 150 | 0.49 | 0.028 | 40 |
|  | 400 | 0.22 | 0.019 | 52 |

By setting the heating temperature high, although the amount of the hydroxyl groups decreased as well as the amount of the adsorbed water decreased, it could have been found that the ranges provided in the invention were satisfied for both the absorption intensity ratio of water and the absorption intensity ratio of hydroxyl group and high gas decomposition performance was exhibited.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the invention.

What is claimed is:

1. A photocatalyst dispersion comprising:
   at least one fine particle selected from a tungsten oxide fine particle and a tungsten oxide composite fine particle; and
   a solvent,
   the solvent comprising ammonia as an ion additive,
   a hydrogen ion concentration index of the photocatalyst dispersion being from pH 5.3 to pH 6.9,
   the photocatalyst dispersion being capable of forming a photocatalyst body by being applied to a surface of a base body, the photocatalyst body comprising: at least one fine particle selected from a tungsten oxide fine particle and a tungsten oxide composite fine particle formed on the surface of the base body, the photocatalyst body satisfying at least one condition of (1) to (3) below and a condition of (4) below:
(1) a ratio of an absorption intensity at a wave number of 3450 $cm^{-1}$ to a peak intensity of an absorption at a wave number of about 1037 $cm^{-1}$ being 0.9 or less when a surface of the photocatalyst body is analyzed by infrared spectroscopy;
(2) a ratio of a maximum peak intensity of an absorption in a wave number range of 1500 $cm^{-1}$ to 1700 $cm^{-1}$ to a peak intensity of an absorption at a wave number of about 1037 $cm^{-1}$ being 0.5 or less when the surface of the photocatalyst body is analyzed by infrared spectroscopy;
(3) the photocatalyst body having no absorption peak in a wave number range of 5000 $cm^{-1}$ 5400 $cm^{-1}$ or a ratio of a maximum peak intensity of an absorption to an absorption intensity at a wave number of 5250 $cm^{-1}$ being 1.7 or less when the surface of the photocatalyst body is analyzed by near infrared spectroscopy;
(4) a ratio of a peak intensity of an absorption at a wave number of about 3690 $cm^{-1}$ to a peak intensity of an absorption at a wave number of about 1037 $cm^{-1}$ being 0.025 or more when the surface of the photocatalyst body is analyzed by infrared spectroscopy, and an adsorption amount of water being suppressed in the photocatalyst body which shows a peak of the absorption corresponding to hydroxyl groups in the infrared spectroscopy.

2. The photocatalyst body according to claim 1, wherein the at least one fine particle has an average primary particle diameter (D50) of 1 nm to 400 nm.

3. The photocatalyst dispersion according to claim 1, wherein a concentration of the fine particle is from 0.1 mass % to 20 mass %.

4. A method for manufacturing the photocatalyst body according to claim 1, comprising:
producing a photocatalyst dispersion comprising at least one fine particle selected from a tungsten oxide fine particle and a tungsten oxide composite fine particle, and a solvent;
applying the photocatalyst dispersion to a surface of a base body, thereby forming a applied photocatalyst dispersion; and
forming a photocatalyst on the surface of the base body by drying the applied photocatalyst dispersion, thereby producing a formed photocatalyst body,
a hydrogen ion exponent of the photocatalyst dispersion being adjusted in the producing the photocatalyst dispersion so that the formed photocatalyst body satisfies at least one condition of (I) to (III) below and a condition of (IV) below:
(I) a ratio of an absorption intensity at a wave number of 3450 $cm^{-1}$ to a peak intensity of an absorption at a wave number of about 1037 $cm^{-1}$ being 0.9 or less when a surface of the formed photocatalyst body is analyzed by infrared spectroscopy;
(II) a ratio of a maximum peak intensity of an absorption in a wave number range of 1500 $cm^{-1}$ to 1700 $cm^{-1}$ to a peak intensity of an absorption at a wave number of about 1037 $cm^{-1}$ being 0.5 or less when the surface of the formed photocatalyst body is analyzed by infrared spectroscopy;
(III) the formed photocatalyst body having no absorption peak in a wave number range of 5000 $cm^{-1}$ to 5400 $cm^{-1}$ or a ratio of a maximum peak intensity of an absorption to an absorption intensity at a wave number of 5250 $cm^{-1}$ being 1.7 or less when the surface of the formed photocatalyst body is analyzed by near infrared spectroscopy; and
(IV) a ratio of a peak intensity of an absorption at a wave number of about 3690 $cm^{-1}$ to a peak intensity of an absorption at a wave number of about 1037 $cm^{-1}$ being 0.025 or more when the surface of the formed photocatalyst body is analyzed by infrared spectroscopy.

5. The method according to claim 4, wherein the hydrogen ion exponent of the photocatalyst dispersion is adjusted with an ion additive to not more than pH 6.9 in the producing the photocatalyst dispersion.

6. The method according to claim 4, wherein the applied photocatalyst dispersion is dried by a condition satisfying at least one of being heated at not less than 110° C. and not more than 500° C. and being placed in an atmosphere with a pressure lower than atmospheric pressure in the forming the photocatalyst on the surface of the base body.

7. The photocatalyst dispersion of claim 1, wherein the hydrogen ion concentration index of the photocatalyst dispersion is higher than 6.5 and lower than 6.9.

8. The photocatalyst dispersion according to claim 1, wherein the solvent comprises ammonia as an ion additive, and the hydrogen on concentration index of the photocatalyst dispersion is from pH 5.3 to pH 5.5.

9. The photocatalyst dispersion according to claim 1, wherein the photocatalyst body satisfies conditions (1), (2), (3) and (4).

* * * * *